United States Patent
Nakamura (10) Patent No.: US 6,751,795 B1
(45) Date of Patent: Jun. 15, 2004

(54) SYSTEM AND METHOD FOR SOFTWARE INSTALLATION

(75) Inventor: Kazuhisa Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/464,395

(22) Filed: Dec. 16, 1999

(30) Foreign Application Priority Data

Dec. 24, 1998 (JP) .......................................... 10-368188

(51) Int. Cl.$^7$ ............................................. G06F 9/445
(52) U.S. Cl. ....................................................... 717/174
(58) Field of Search ........................ 717/174, 168–178, 717/110–113, 122; 707/200–206, 8, 10; 709/220–222

(56) References Cited

U.S. PATENT DOCUMENTS

| | | | |
|---|---|---|---|
| 5,680,609 A | * 10/1997 | Reinhardt | 707/10 |
| 5,848,422 A | * 12/1998 | Sato et al. | 717/170 |
| 5,999,740 A | * 12/1999 | Rowley | 709/221 |
| 6,009,274 A | * 12/1999 | Fletcher et al. | 717/173 |
| 6,049,671 A | * 4/2000 | Slivka et al. | 717/173 |
| 6,189,146 B1 | * 2/2001 | Misra et al. | 717/177 |
| 6,317,797 B2 | * 11/2001 | Clark et al. | 707/200 |
| 6,324,691 B1 | * 11/2001 | Gazdik | 717/178 |
| 6,327,705 B1 | * 12/2001 | Larsson et al. | 717/174 |
| 6,385,652 B1 | * 5/2002 | Brown et al. | 717/120 |

FOREIGN PATENT DOCUMENTS

| | | |
|---|---|---|
| JP | 02-72445 | 3/1990 |
| JP | 03-34017 | 2/1991 |
| JP | 4-30218 | 2/1992 |
| JP | 5-334162 | 12/1993 |
| JP | 6-274325 | 9/1994 |
| JP | 7-129407 | 5/1995 |
| JP | 8-30441 | 2/1996 |
| JP | 10-3380 | 1/1998 |
| JP | 10-21061 | 1/1998 |

OTHER PUBLICATIONS

Seemann et al. Visualization of Differences Between Versions of Object–Oriented Software. IEEE. Mar. 1998. pp. 201–204.*

Symborski. Updating Software and Configuration Data in a Distributed Communications Network. IEEE. 1988. pp. 331–338.*

* cited by examiner

*Primary Examiner*—Wei Zhen
(74) *Attorney, Agent, or Firm*—Sughrue Mion, PLLC (57) ABSTRACT

The system for software installation of the present invention comprises: a storage medium for storing a file to be installed; a difference detector for comparing the file in the storage medium with a file in a target, and detecting a difference therebetween; a file operation determination device for determining an operation for the file, based on the comparison by the difference detector; and an installer for performing installation, based on the determination made by the file operation determination device.

12 Claims, 6 Drawing Sheets

SYSTEM AND METHOD FOR SOFTWARE INSTALLATION

BACKGROUND OF THE INVENTION

1. Field of the Invention

The present invention relates to a system and method for software installation.

This application is based on Japanese Patent Application No. Hei 10-368188, the contents of which are incorporated herein by reference.

2. Description of the Related Art

Figure 6:
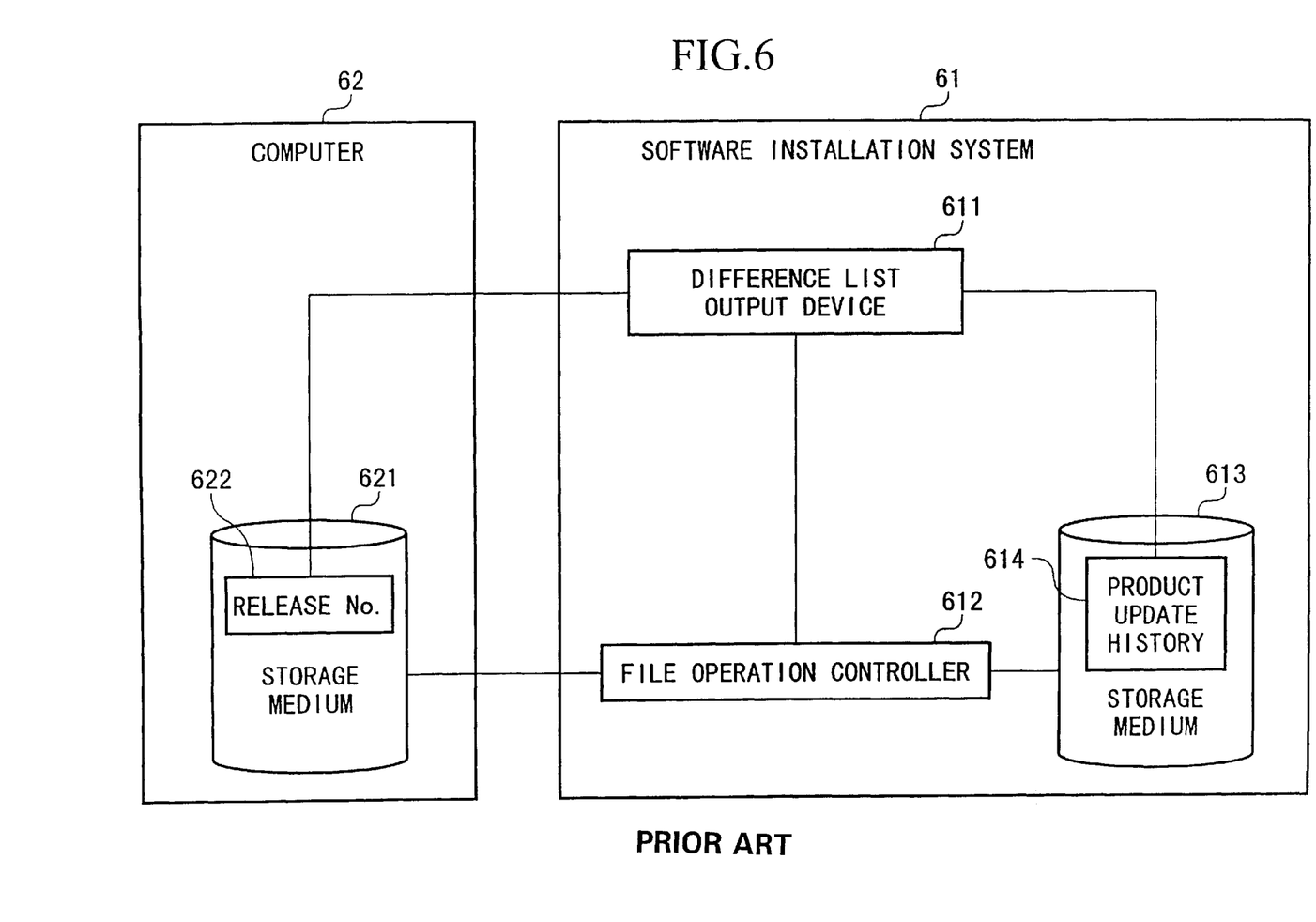
FIG. 6 is a block diagram showing the conventional technique.

A conventional system for software installation is disclosed in Japanese Patent Application, First Publication No. Hei 4-30218. Referring to FIG. 6, the conventional system for software installation 61 comprises a difference list output device 611, a file operation controller 612, and a storage medium 613. The difference list output device outputs a list indicating a difference, based on a release number 622 of the product in a storage medium 621 in a computer 62 and on a product update history recorded in the storage medium 613. Based on this list, the file operations for installation are performed.

This conventional technique has the following problems:

The first disadvantage is that the installation cannot be performed while maintaining the data updated by the user. The data updated by the user cannot be completely deleted, and the initial installation state cannot be recovered. The reason for this is that the file operations for installation do not depend on the difference between the files but are always determined based on the release number of the product in the computer and on the product update history recorded in the storage medium.

The second disadvantage is that a damaged file cannot be recovered. The reason for this is that the damaged file is excluded from the target because the file operations are determined based on the release number and the product update history.

BRIEF SUMMARY OF THE INVENTION

It is therefore an object of the present invention to provide a system and method for software installation which can appropriately select file operations and target files.

In a first aspect of the present invention, the system for software installation comprises: a storage medium for storing a file to be installed; a difference detector for comparing the file in the storage medium with the file in a target, and detecting a difference therebetween; a file operation determination device for determining an operation for the file, based on the comparison by the difference detector; and an installer for performing an installation, based on the determination made by the file operation determination device.

In a second aspect of the present invention, the difference detector comprises a list output device for outputting a list describing a difference between the file in the storage medium and the file in the target.

In a third aspect of the present invention, the system for software installation further comprises a file operation course selector for selecting a file operation course, depending on the type of the difference.

In a fourth aspect of the present invention, the file operation course selector selects to perform no file operation when the file in the storage medium is identical to the file in the target, to copy the file from the storage medium to the target when the file in the storage medium is different from the file in the target, to copy the file from the storage medium to the target when the file in the storage medium is not stored in the target, and to delete the file from the target when the file is not stored in the storage medium but is stored in the target.

In a fifth aspect of the present invention, the file operation determination device determines prohibiting a file operation for a file containing a setting value for software and for a file containing user data.

In a sixth aspect of the present invention, the file operation determination device determines copying the file from the storage medium to the target only when the file in the storage medium is newer than the file in the target.

In a seventh aspect of the present invention, the software installation method comprises the steps of: recording a file for installation; comparing the recorded file with a file in a target and detecting a difference therebetween; determining an operation for the file, based on the detection; and performing installation, based on the determination.

According to the present invention, the installation becomes quick because the invention installs only the different software files.

Further, a damaged file in the target computer can be detected or recovered, because the invention compares the files in the target with the source files to thereby detect the differences.

The installation is achieved while maintaining files personally added by a user because the file operations are preset based on the differences.

The invention avoids overwriting the latest version file, because no file operation is performed when the file version in the computer is newer than the file in the installation system.

DETAILED DESCRIPTION OF THE INVENTION

Figure 1:
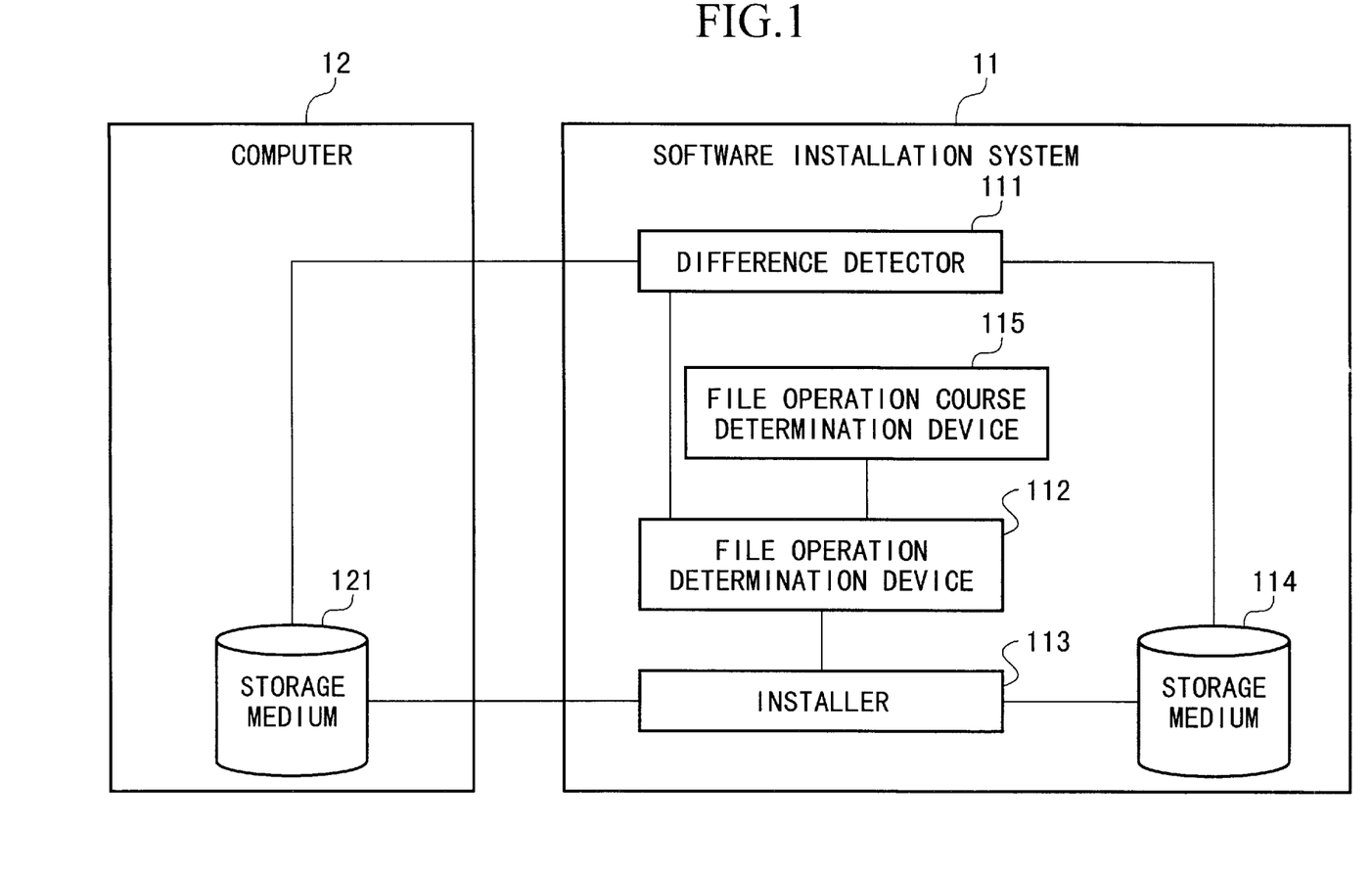
FIG. 1 is a block diagram showing the first embodiment of the present invention.

FIG. 1 shows the first embodiment of the present invention. The system for software installation of the first embodiment comprises a difference detector 111, a file operation determination device 112, an installer 113, a storage medium 114, and a file operation course selector 115. The software installation system 11 is to install the software in a storage medium 121 in a computer 12.

The difference detector 111 compares files, which are installed and stored in the storage medium 121 in the computer 12, with files which are stored in the storage medium 114 in the software installation system 11, and outputs the list describing the presence or absence of the files and the differences in content between the files. Based on the file content difference list, the file operation determination device 112 selects one of the operations of addition, replacement, and deletion for each file, and outputs a file operation list. According to the file operation list, the installer 113 copies files, which are not stored in the storage medium 121 in the computer 12 or which were updated, from the storage medium 114 in the software installation system 11 to the storage medium 121, and deletes unnecessary files from the storage medium 121 in the computer 12. The file operation course selector 115 selects a file operation course, depending on the types of differences between the files.

The operation of the embodiment will now be explained. The storage medium 114 in the software installation system 11 stores all software files to be installed.

The difference detector 111 finds the differences between the files, which are installed and stored in the storage medium 121 in the computer 12, and the files which are stored in the storage medium 114 in the software installation system 11, and outputs the list. The file difference list includes the following information, e.g., "the file is stored in the storage medium 121 but is not stored in the storage medium 114", "the file is not stored in the storage medium 121 but is stored in the storage medium 114", "the file in the storage medium 114 was updated and is newer than the corresponding file in the storage medium 121", or "the file, which was updated and is newer than the file in the storage medium 114, is stored in the storage medium 121."

The file operation course selector 115 selects a file operation course for the file operation determination device 112, depending on the types of differences. Based on the file difference list, the file operation determination device 112 determines, e.g., copying the files from the storage medium 114 in the software installation system to the storage medium 121 in the computer 12, and deleting the files from the storage medium 121, and then outputs the file operation list.

According to the file operation list, the installer 113 copies the files from the storage medium 114 in the software installation system 11 to the storage medium 121 in the computer 12, and deletes unnecessary files from the storage medium 121 in the computer 12.

Figure 2:
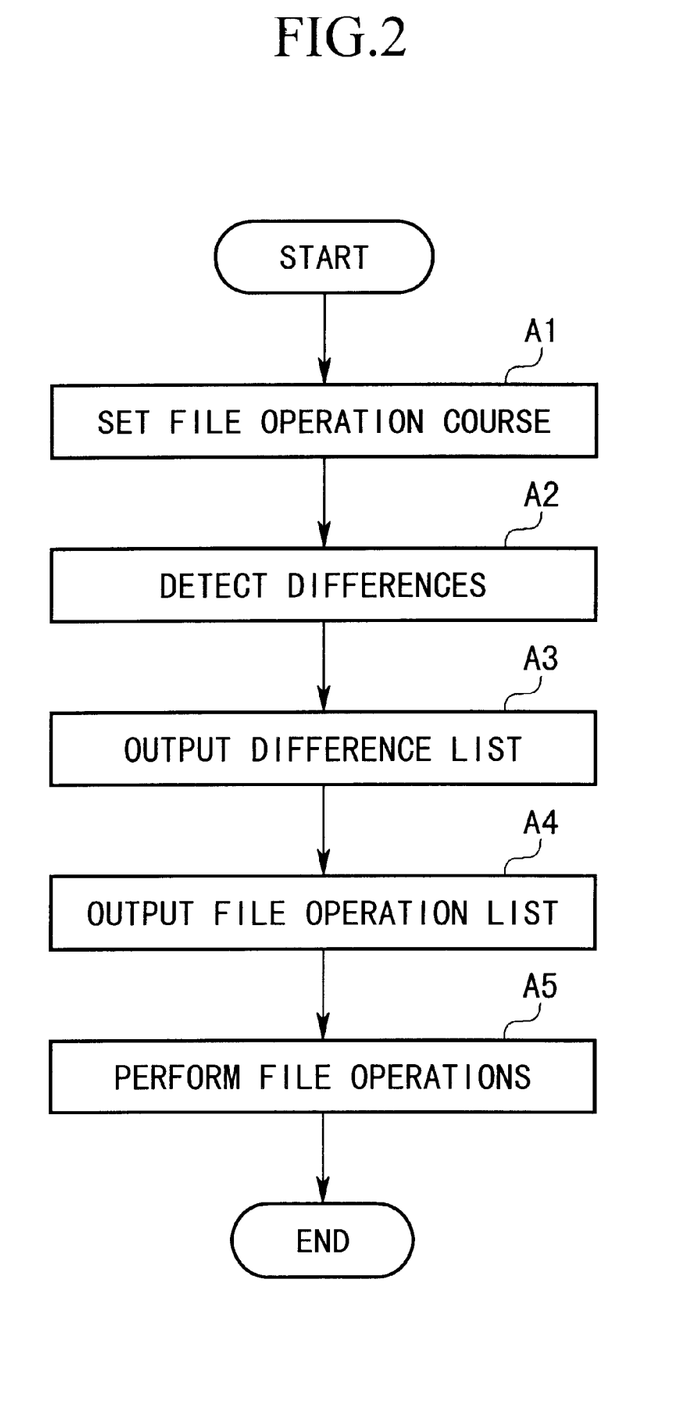
FIG. 2 is a flowchart showing the operation of the first embodiment.

The operation of the embodiment will be explained in more detail with reference to the flowchart of FIG. 2. The file operation course selector 115 determines which operation the file operation determination device 112 is to determine, depending on the types of the differences in file content between the storage medium 121 and the storage medium 114 (step A1 in FIG. 2).

For example, when there is no difference between a file A in the storage medium 121 in the computer 12 and a file A in the storage medium 114 in the software installation system 11, no file operation is performed, or when the file A in the storage medium 114 in the software installation system 11 is newer than the file A' in the storage medium 121 in the computer 12, the file A is copied from the storage medium 114 to the storage medium 121.

This step may be omitted when a default operation is preset, and an operator may not select the operation.

The difference detector 111 compares the files in the storage medium 121 in the computer 12 and the files in the storage medium 114 in the software installation system 11, to detect the differences (step A2), and outputs the list describing the differences (step A3).

The difference detector 111 can find the difference by comparing time stamps, file sizes, file versions, and file data.

Based on the file difference list produced in step A2 and the setting selected in step A1, the file operation determination device 112 outputs the list of operations for the files (step A4).

Finally, based on the list output in step A3, the installer 113 performs copying or deletion of the files (step A5).

The operation of the embodiment will be explained in more detail by way of an example. For instance, the computer 12 is supplied with the software installed therein. The storage medium 121 is a hard disc drive built into the computer. The software installation system 11 is to reset the computer 12 to the initial state as was delivered to the user. The contents in the storage medium 121 in the computer 12 was changed by the user. The storage medium 114 in the software installation system 11 stores the files which were initially stored in the storage medium 121 when the computer 12 was delivered to the user.

Figure 3:
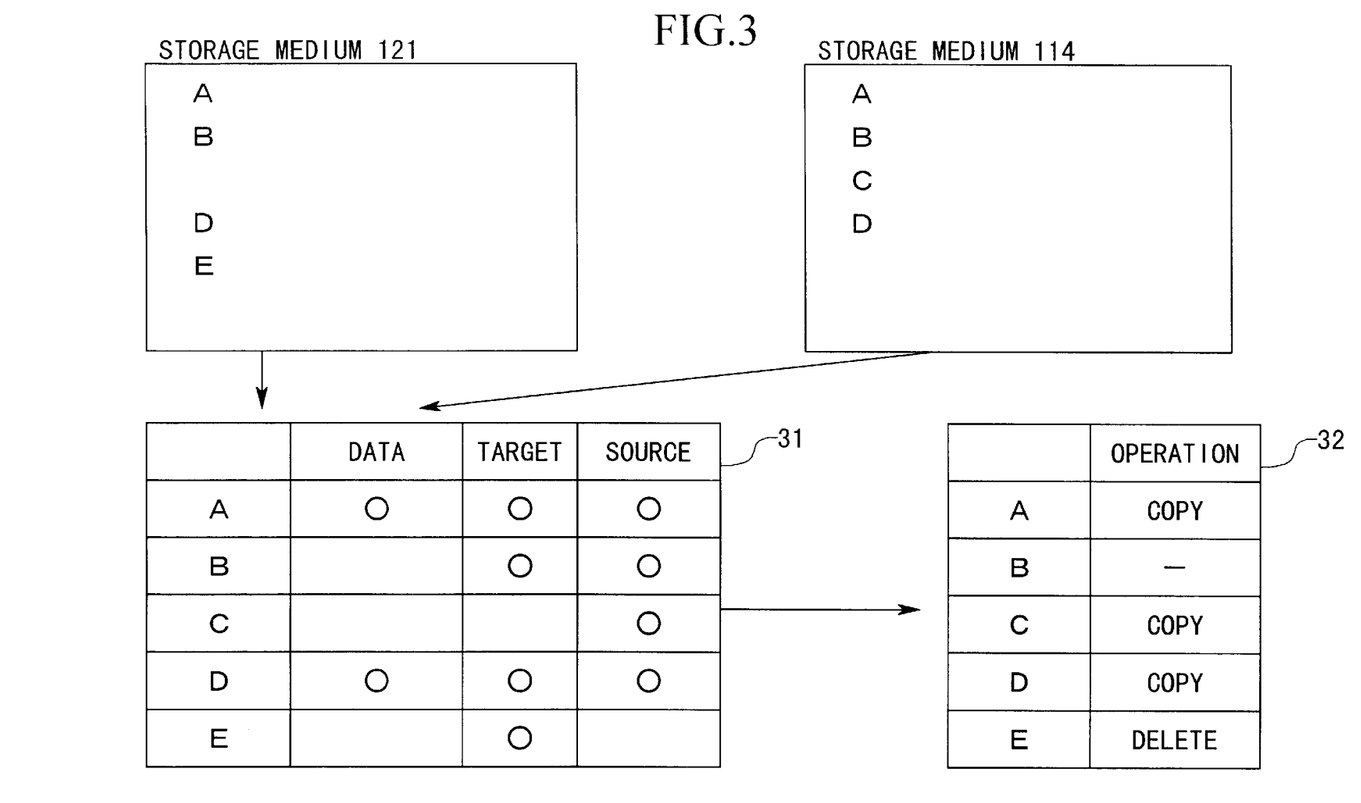
FIG. 3 is a diagram showing an example of the operations of the first embodiment.

As shown in FIG. 3, the storage medium 121 in the computer 12 stores files A, B, D, and E. The storage medium 114 stores files A, B, C, and D. The file operation determination device 112 is instructed such that "no file operation is performed when the files in the storage medium 121 and the files in the storage medium 114 have no difference", "the file is copied from the storage medium 114 to the storage medium 121 when the file in the storage medium 121 differs from the file in the storage medium 114", "the file is deleted from the storage medium 121 when the corresponding file is not stored in the storage medium 114", and "the file is copied from the storage medium 114 to the storage medium 121 when the file in the storage medium 114 is not stored in the storage medium 121".

The difference detector 111 compares the files in the storage medium 121 with the files in the storage medium 114, and outputs the difference list. For each file, the difference list in FIG. 3 indicates ○ in the "data" section when the files are different, indicates ○ in the "target" section when the file is stored in the storage medium 121, and indicates ○ in the "source" section when the file is stored in the storage medium 114.

Based on the difference list, the file operation determination device 112 determines the operation for each file, and outputs the file operation list 32. The file operation list 32 in FIG. 3 indicates "COPY" to copy the file from the storage medium 114 to the storage medium 121, "DELETE" to delete the file from the storage medium 121, or "–" to perform no operation.

According to the file operation list 32, the installer 113 performs the operations for the files. Thus, the files in the storage medium 114 in the software installation system 11 can be installed, so that the files in the storage medium 121 in the computer 12 can be reset to the initial state as was delivered to the user.

The second embodiment of the present invention will be explained. The second embodiment has the same structure as the first embodiment in FIG. 1. The second embodiment updates the version of the software installed in the storage medium 121 in the computer 12.

Figure 4:
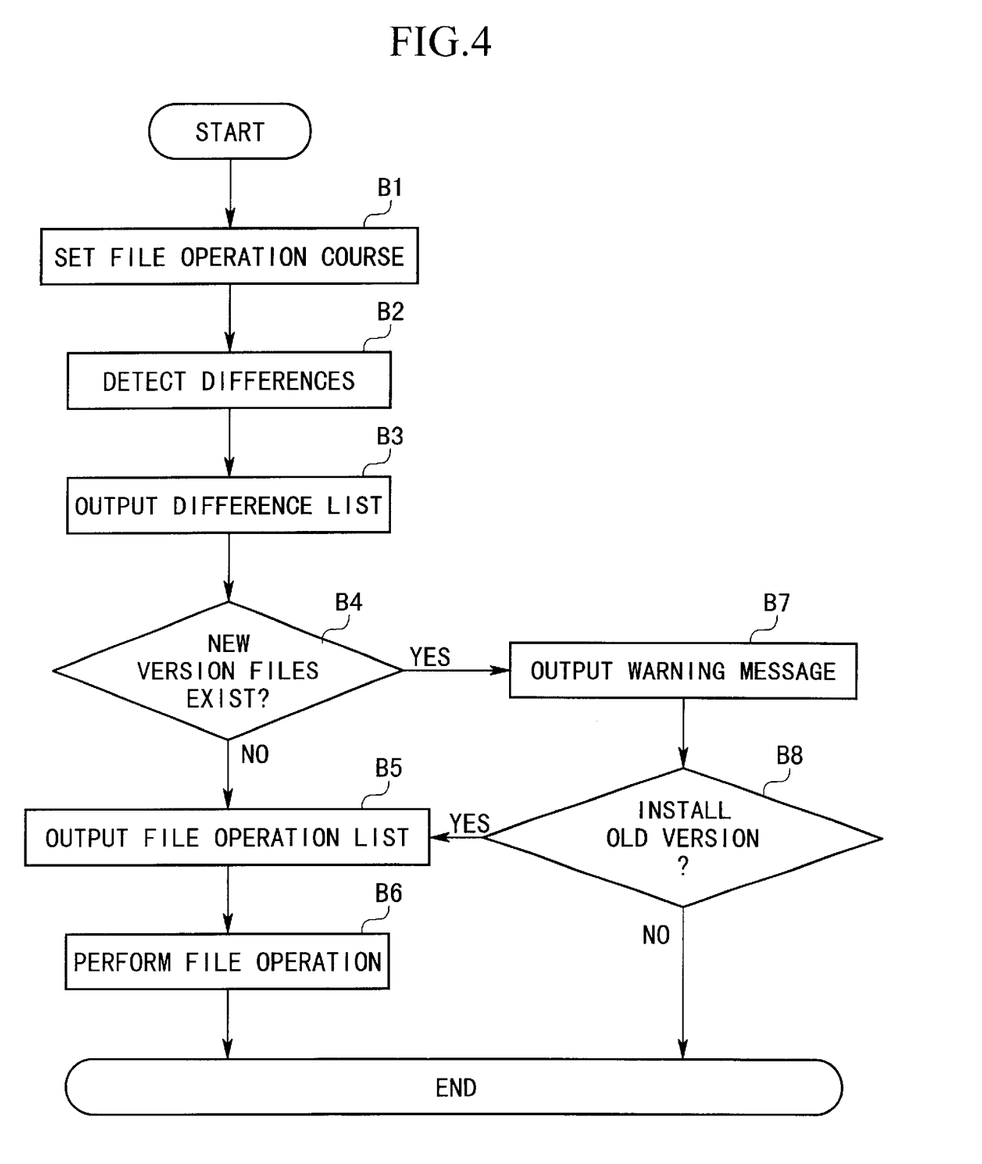
FIG. 4 is a flowchart showing the operation of the second embodiment of the present invention.

The operation will be explained with reference to FIG. 4. Initially, the user decides whether to maintain the current data or to delete all the data while installing new data. The file operation course selector 115 instructs the file operation course to the file operation determination device 112 (step B1 in FIG. 4).

The difference detector 111 compares the files, which are installed in the storage medium 121 in the computer 12, with the files in the storage medium 114 in the installation system 11 (step B2), and outputs the list indicating the differences between the files (step B3).

Based on the file difference list, the system indicates a warning message when the files installed in the storage medium 121 in the computer 12 are newer than the files to be installed (step B7).

Then, the user determines whether to continue the installation of the old version (step B8), and when the user stops the installation, the process is terminated. When the version of the software to be installed is newer or the user wishes to continue the installation, the file operation determination device 112 outputs the list indicating the operations for the files, based on the course setting in step B1 and the file difference list obtained in step B2 (step B5).

Finally, the installer 113 performs the file operations according the list output in step B3 (step B6).

Figure 5:
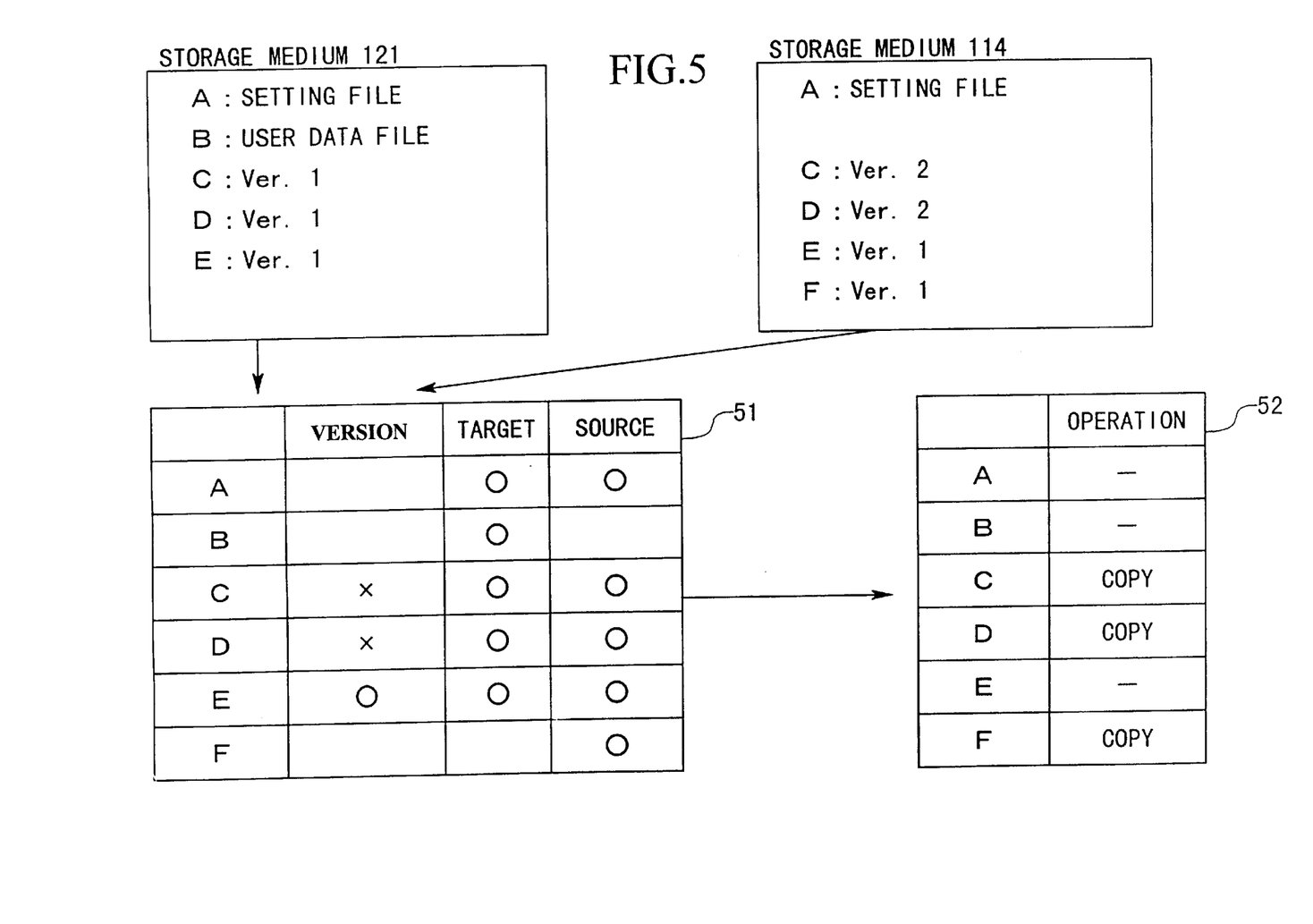
FIG. 5 is a diagram showing an example of the operations of the second embodiment.

The operation of the second embodiment will be described in more detail by way of an example with reference to FIG. 5. As shown in FIG. 5, the storage medium 121 in the computer stores the software files A, B, C, D. and E of the old version. The storage medium 114 stores the software files A, C, D, E, and F of the latest version. The file A is a setting file which records the user setting, the file B is a data file which the user produced, and the files C and D are of the updated version.

The file operation course determination device 115 instructs the file operation determination device 112 to maintain the file which includes the setting values for the software and the data used by the software.

The difference detector 111 compares the files in the storage medium 121 with the files in the storage medium 114, and outputs the list 51 indicating the differences between the files as shown in FIG. 5. For each file, the difference list in FIG. 5 indicates X in the "version" section when the versions of the files are different, indicates o in the "version" section when the versions of the files are identical, indicates o in the "target" section when the file is stored in the storage medium 121, and indicates o in the "source" section when the file is stored in the storage medium 114.

Based on the difference list, the file operation determination device 112 determines the operation for each file, and outputs the file operation list 52. Because in step B1 the user selected to maintain the setting file for software and the data file used for software, the file operation list 52 in FIG. 5 indicates "copy" of the files, which are of the latest version or which 20 are stored only in the storage medium 114, from the storage medium 114 to the storage medium 121, and indicates for the other files which means that no operation is performed.

Finally, the installer 113 performs the operations for the files according to the file operation list 52. Thus, the system can have the software updated while maintaining the user data and settings.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A system for software installation comprising:

a storage medium for storing a file to be installed;

a difference detector for determining if a file that corresponds to the file on said storage medium is present on a target, and if such a file is present on said target, comparing the file in said storage medium with the corresponding file in said target, and detecting a difference therebetween;

a file operation course selector for selecting a file operation course, wherein the file operation course selector is set prior to differences being detected between a file on said storage medium and a corresponding file on said target;

a file operation determination device for determining an operation for the file in the target, based on the comparison by said difference detector; and an installer for performing installation, based on the determination made by said file operation determination device, wherein said file operation determination device is not positioned in said target.

2. A system for software installation according to claim 1, wherein said difference detector comprises a list output device for outputting a list describing a difference between the file in said storage medium and the file in said target.

3. A system for software installation according to claim 1, wherein said file operation course selector selects to perform no file operation when the file in said storage medium is identical to the file in said target, to copy the file from said storage medium to said target when the file in said storage medium is different from the file in said target, to copy the file from said storage medium to said target when the file in the storage medium is not stored in the target, and to delete the file from said target when the file is not stored in the storage medium but is stored in the target.

4. A system for software installation according to claim 1, wherein said file operation determination device determines prohibiting a file operation for a file containing a setting value for software and for a file containing user data.

5. A system for software installation according to claim 1, wherein said file operation determination device determines copying the file from the storage medium to the target only when the file in the storage medium is newer than the file in the target.

6. The system of claim 1, wherein said difference detector is not positioned in said target.

7. A software installation method comprising the steps of:

recording a file for installation;

comparing the recorded file with a file in a target and detecting a difference therebetween;

determining if a file that corresponds to the recorded file is present on a target, and if such a file is present on said target, comparing the recorded file with the corresponding file in said target, and detecting a difference therebetween;

selecting a file operation course, wherein the file operation course is set prior to differences being detected between the recorded file and a corresponding file on said target;

determining an operation for the file in the target, based on the detection; and performing installation, based on the determination, wherein said determining is not performed in said target.

8. The method of claim 7, wherein said detecting said difference comprises generating a list describing said difference between the file in said storage medium and the file in said target.

9. The method of claim 7, wherein said file operation course comprises at least one of (a) performing no file operation when the file in said storage medium is identical to the file in said target, (b) copying the file from said storage medium to said target when the file in said storage medium is different from the file in said target, (c) copying the file from said storage medium to said target when the file in the storage medium is not stored in the target, and (d) deleting the file from said target when the file is not stored in the storage medium but is stored in the target.

10. The method of claim 7, wherein said performing comprises prohibiting a file operation for a file containing a setting value for software and for a file containing user data.

11. The method of claim 7, wherein said performing comprises copying the file from the storage medium to the target only when the file in the storage medium is newer than the file in the target.

12. The method of claim 7, wherein at least one of said comparing and said detecting is not performed in said target.

\* \* \* \* \*